United States Patent [19]

Nakrokhin et al.

[11] 4,272,814

[45] Jun. 9, 1981

[54] APPARATUS FOR COMPENSATION OF COMMUTATION DIPS IN SYNCHRONIZING VOLTAGE CURVES

[76] Inventors: Vladilen G. Nakrokhin, ulitsa Baumana, 32a, kv. 9; Vladimir M. Katunin, ulitsa Shefskaya, 30, kv. 8, both of Sverdlovsk, U.S.S.R.

[21] Appl. No.: 84,724

[22] Filed: Oct. 15, 1979

[51] Int. Cl.³ .............................................. H02M 1/08
[52] U.S. Cl. ..................................... 363/129; 318/716
[58] Field of Search .......................... 363/39, 87, 129; 318/716–719

[56] References Cited

U.S. PATENT DOCUMENTS 3,883,792  5/1975  Ellert ...................................... 363/39

FOREIGN PATENT DOCUMENTS 584405  12/1977  U.S.S.R. .................................... 363/87

*Primary Examiner*—William H. Beha, Jr.

[57] ABSTRACT

An apparatus for compensation of commutation dips in the curves representing synchronizing voltages developed by an excitation system of a synchronous machine comprises a thyristor converter and a matching transformer, and includes measuring transformers. Two of the measuring transformers have their primaries coupled to secondaries and primaries of the matching transformer in antiphase relation to each other, while primaries of a third measuring transformer are coupled to the arms of the thyristor converter in antiphase relation to the primaries of the second measuring transformer. The opposite ends of the primaries of each of the measuring transformers are joined together to constitute common points. The secondaries of the measuring transformers are coupled in cophasal relation to one another. One end of each of the secondaries is coupled to a respective adjusting resistor which has its movable contact connected via scaling resistors to a respective operational amplifier.

1 Claim, 2 Drawing Figures

APPARATUS FOR COMPENSATION OF COMMUTATION DIPS IN SYNCHRONIZING VOLTAGE CURVES

FIELD OF THE INVENTION

The invention relates to electric engineering and, more particularly, to apparatus for compensation of the commutation dips in the curves representing the synchronizing voltages developed by the excitation systems of synchronous machines.

The apparatus of the invention is suitable for use in the thyristor excitation systems of synchronous machines and in d.c. electric drives.

DESCRIPTION OF THE PRIOR ART

Many excitation systems of synchronous machines comprise a thyristor converter having its output coupled to the field winding of the synchronous machine, and having its input coupled to the secondaries of a matching transformer via a booster transformer.

In such a system, the current passing through the synchronous machine produces a current component in the e.m.f. of the booster transformer. As a result, a phase shift occurs between the input voltages of the matching transformer and the input voltages of the thyristor transformer. To eliminate that phase shift, the synchronization circuits should be fed from the input of the thyristor converter. With such a connection scheme, the synchronization circuits receive synchronizing voltages whose shapes are given commutation dips which result from a drop of the voltages across the inductive elements of the matching and booster transformers. Therefore, it is very important that the commutation dips in the curves representing the synchronizing voltages be eliminated.

The solve this problem, namely, to make the synchronizing voltages sinusoidal, use is made of intermediate filters which would smooth the supply voltage (cf. an article entitled "The Influence of Mains Commutation Distrotions on the Devices Effecting Phase Control of Thyristor Converter" by M. V. Olschvang et al. in "Converter Engineering" No. 6, 1970, in Russian). The intermediate filters introduce a marked phase shift between the input and the output voltage which amounts to a ten of electrical degrees. As a result, the reliability of the excitation system is impaired due to the fact that more distortion and inertia occur in the excitation system, and the output voltage decreases as well.

Known in the art is an apparatus for compensation of the commutation dips in the curves representing the synchronizing voltages developed by a systems based on thyristor converters, which apparatus comprises measuring current transformers having their primaries coupled to the main circuit of the thyristor converter on the a.c. side (cf. the USSR Inventor's Certificate No. 140,879, Inyt.Cl. H02M1/04).

The measuring current transformers make it possible to compensate for the commutation dips only in their operating mode which is very similar to idle operation. This condition requires that the transformers be matched with the load parameters and be given the transformation ratios in accordance with the type of the converter used.

In this case, a minimal compensation error can be attained only for the measuring current transformers operated in a mode close to idle operation, while that error tends to rise with the load. As a result, it is impossible to completely compensate for the commutation distortion of the synchronization voltage curves, with the result that the excitation system of the synchronous machine operates with failures.

An object of the invention is to provide for greater reliability with which the excitation system of a synchronous machine could operate.

Another object of the invention is to provide for an apparatus for compensation of the commutation dips in the curves representing synchronizing voltages, which apparatus could provide for more precise compensation of the commutation dips irrespective of the load of the measuring transformers.

Still another object of the invention is to provide for an apparatus for compensation of the commutation dips in the curves representing synchronizing voltages, which apparatus would be implemented on the basis of a standard-type circuit whose elements are selected in a manner independent of the parameters of the excitation system of the synchronous machine.

In accordance with the invention an apparatus for compensation of the commutation dips in the curves representing the synchronizing voltages developed in the excitation system of a synchronous machine, includes a thyristor converter and a matching transformer, and measuring transformers, equal in number to the number of phases of the thyristor converter. In each phase of the thyristor converter the ends of the primaries of first and second measuring transformers are coupled respectively to the primaries and secondaries of the matching transformer, in antiphase relation to each other. A third measuring transformer has its primaries coupled to the arms of the thyristor converter in antiphase relation to the primaries of the second measuring transformer which is coupled to the secondaries of the matching transformer. The opposite ends of the primaries of each of the measuring transformers are coupled to one another. The secondaries of the measuring transformers are coupled in cophasal relation to one another and one end of each of the secondaries are coupled to an adjusting resistor, the opposite ends of the secondaries of the measuring transformers being joined together to constitute a common point. The movable contacts of each of the adjusting resistors are coupled in phase relation to the inputs of respective operational amplifiers via scaling resistors which provide for the required transfer ratios for the operational amplifiers, the operational amplifiers providing for the addition of the voltages developed in respective phase sections of the thyristor converter.

The invention makes it possible to eliminate distortion in the shape of the curves representing synchronizing voltage with the result that the reliability of the excitation system of the synchronous machine is increased.

BRIEF DESCRIPTION OF THE INVENTION

The invention will now be described, by way of example, with reference to the accompanying drawings in which:

FIG. 1 is a circuit diagram of an apparatus for compensation of the commutation dips in the curves representing the synchronizing voltages developed by the excitation system of a synchronous machine, according to the invention; and FIGS. 2a-2c are graphs showing the voltage-time curves corresponding to different points of the apparatus circuit, according to the invention.

DETAILED DESCRIPTION OF THE INVENTION

Figure 1:
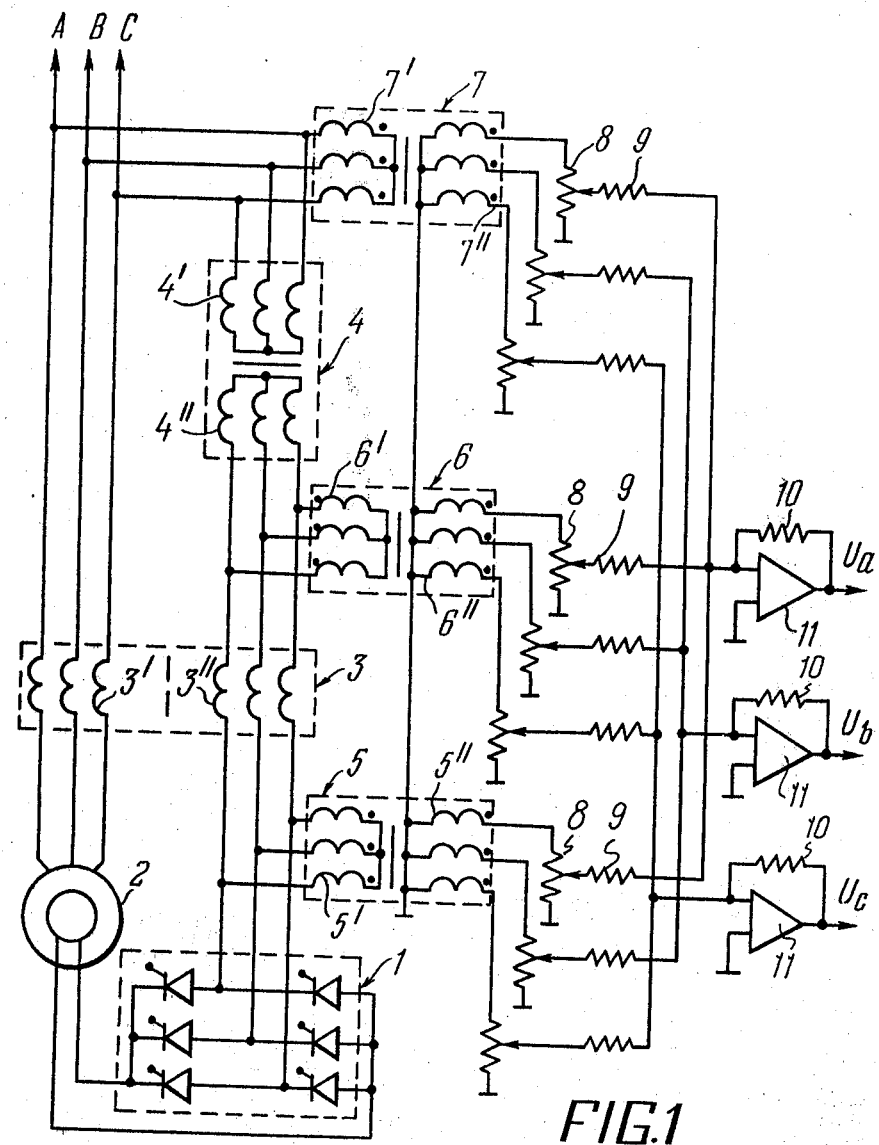

The circuit diagram of the apparatus of the invention (FIG. 1) comprises an excitation system of a synchronous machine 2 including an m-phase thyristor converter 1 (with m=3 in the given embodiment). The converter is designed to supply the field winding of the machine with an excitation voltage and has phases A,B and C. Connected in series with the stator winding of the machine 2 are primaries 3' of a booster transformer 3 in each of the phases A,B and C. Secondaries 3" of the booster transformer 3 are coupled in series with secondaries 4" of the matching transformer 4 and with the arms of the converter 1. Primaries 4' of the matching transformer 4 are coupled in phase relation to the output buses of the machine 2 in the path following the booster transformer 3. The booster transformer 3 is designed to produce extra energy at the output of the converter 1 in the case of emergency, for example, during mains shorts, thereby providing reliable operation of the machine 2 in different operating modes.

The excitation system also comprises measuring transformers 5, 6 and 7 having their primaries 5', 6' and 7' and their secondaries 5", 6" and 7" equal in number to the number of phases A, B and C (namely, to three) of the converter 1. In each of the phases A, B and C the primaries 7' and 6' of the measuring transformers 7 and 6 are coupled respectively to the primary 4' and the secondary 4" of the matching transformer 4 in antiphase relation to each other. To this end, the beginnings of the primaries 6' of the measuring transformer 6 are coupled to the common point which joins the secondaries 3" and 4" of the booster and matching transformers 3 and 4 respectively; the ends of the primaries 7' of the measuring transformer 7 are coupled to the primaries 4' of the matching transformer 4. The primaries 5' of the measuring transformer 5 are coupled in antiphase relation to the primaries 6' of the measuring transformer 6; for this, the ends of the primaries 5' of the measuring transformer 5 are coupled to the secondaries 3" of the booster transformer 3 and to the arms of the thyristor 1. The beginnings of the primaries 5' and 7' of the measuring transformers 5, 7 and the ends of the primaries 6' of the measuring transformer 6 are coupled to one another.

The secondaries 7", 6" and 5" of the measuring transformers 7, 6 and 5 are coupled in cophasal relation to one another. In this case, the beginnings of the secondaries 5", 6" and 7" of the measuring transformers 5, 6 and 7 are coupled to the adjusting resistors 8 which have their movable contacts coupled, via scaling resistors 9, 10 and in phase relation to the inputs of one of operational amplifiers 11. The operational amplifiers operate in cooperation with the scaling resistors 9 and 10 to sum up the voltages delivered from the measuring transformers 5, 6 and 7 in each of the phases A, B and C. Connecting a circuit comprised of the measuring transformer 5, 6 or 7 and a respective one of the adjusting resistors 8 to the desired points of the phases A, B and C provides for a selection of d.c. voltages of various shapes which are characteristic of these points. The scaling resistors 9 and 10 and the operational amplifier 11, inserted in the phases A, B and C, make it possible to select the commutation dips in the curves representing the synchronizing voltages and to add these dips to the voltage whose wave-shape involves commutation dips following one another in antiphase relation to those being selected, with the result that the latter are compensated.

Figure 2:
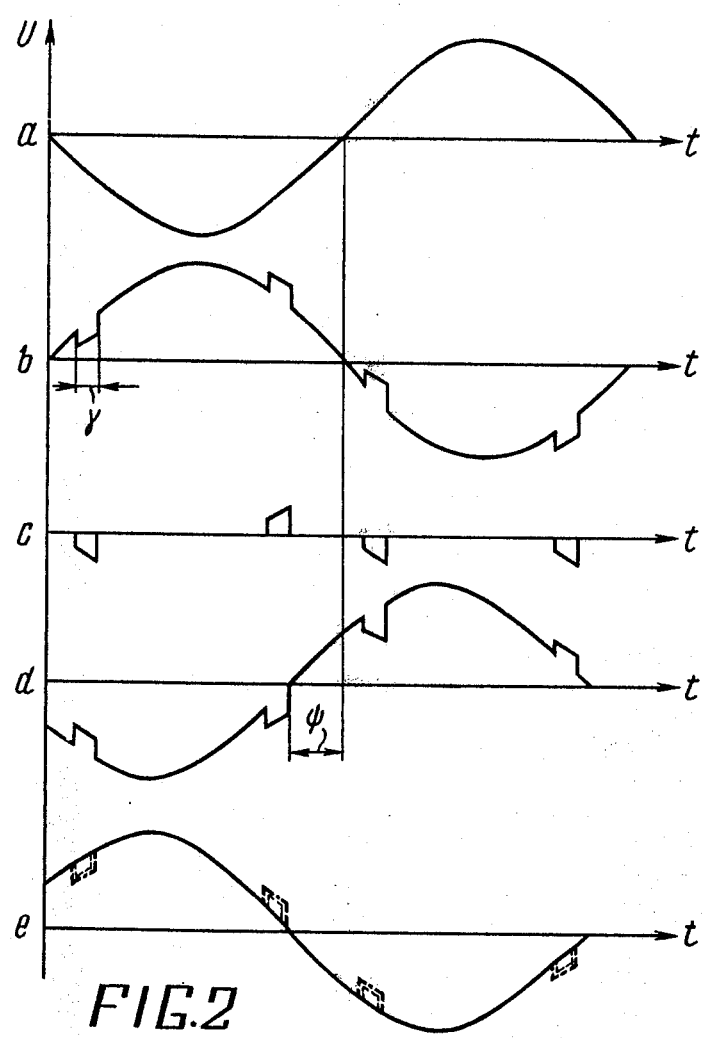

FIGS. 2a-2c illustrate the voltage-time curves characteristic of different points in each of the phases A, B and C, where the time t is plotted on the axis X and the voltage U is plotted on the axis Y.

FIG. 2a illustrates the voltage picked up from the secondary 7" of the measuring transformer 7 and referred to the output of the operational amplifier 11, provided that no signals are available from the measuring transformers 5 and 6.

FIG. 2b illustrates the voltage picked up from the secondary 6" of the measuring transformer 6 and referred to the output of the operational amplifier 11, provided that no signals are available from the measuring transformers 5, 7.

FIG. 2c illustrates the total voltage obtained from the summation of the voltages of FIGS. 2a and 2b, provided that there is no signal from the measuring transformer 5. That total voltage represents the intrinsic distortion (commutation dips) where $\gamma$ is the commutation angle described in more detail later.

FIG. 2d illustrates the voltage picked up from the secondary 5" of the measuring transformer 5, provided that the measuring transformers 6 and 7 are disabled. Here $\psi$ is the phase shift between the input voltage of the matching transformer 4 and the input voltage of the thyristor converter 1.

FIG. 2e illustrates the total voltage existing in the operated excitation system of the machine 2 when the measuring transformers 5, 6 and 7 are energized.

In adjusting the apparatus of the invention in accordance with the parameters of the excitation system, including the thyristor converter 1 and the matching and booster transformers 4 and 3, standard-type voltage measuring transformers 5, 6 and 7 rated for preset parameters are connected which are operated within the linear portion of the magnetization curve. As a result, the output voltage produced by the transformers 5, 6 and 7 is proportional to the input one and the waveform of the output voltage is the same as that of the input voltage. In the case of a high-voltage winding of the stator of the synchronous machine 2, a h.t. voltage transformer of a standard design can be used for the measuring transformer 7.

The parameters of the scaling resistors 9 and 10, adjusting resistors 8 and operational amplifiers 11 are maintained constant and are independent of the parameters of the excitation system. Using the adjusting resistors 8, one can choose the required transfer ratios of the operational amplifiers 11 for the phases A, B and C and equalize their variation due to a different number of turns in the windings of the measuring transformers 5, 6 and 7. The movable contacts of the adjusting resistors 8 inserted respectively into the circuits of the secondaries 6" and 7" of the measuring transformers 6 and 7 (for example, for phase A) are set so that the amplitudes of the voltages across them are equal to a given value (FIGS. 2a and 2b). In the case of phase A, provided that the mesuring transformer 5 generates no voltage, the operational amplifier 11 produces the signals characteristic of commutation dips with the required degree of accuracy (FIG. 2c).

The movable contact of the adjusting resistor 8 (FIG. 1) inserted in the circuit of the secondary 5" of the measuring transformer 5 is set to a position in which the amplitude of the commutation dips in the curve representing the synchronizing voltage (FIG. 2d) will be of a value close to the amplitude of the selected commutation dips (FIG. 2c). In this case, the commutation dips in the curve of the synchronizing voltage taken from the output of the operational amplifier 11, coupled to phase A (FIG. 2e), are compensated for with the required accuracy. For phases B and C, use is made of analogous adjustment procedure.

The apparatus of the invention operates in the following manner. When the synchronous machine 2 is activated, a voltage proportional to that across the primary 4' of the matching transformer 4 is picked up from the secondary 7" of the measuring transformer 7. The waveform of the picked-up voltage is shown in FIG. 2a.

Picked up from the secondary 6" of the measuring transformer 6 is a voltage proportional to that across the secondary 4" of the matching transformer 4. That voltage is in antiphase relation to the voltage picked up from the secondary 7" of the measuring transformer 7 and has the waveform shown in FIG. 2b. According to the figure, the commutation dips in the synchronizing curve, obtained from a drop of the voltage across the inductive element of the matching transformer 4, occur only during the variation of the currents of the thyristor converter 1. The length of the commutation dips is determined by the commutation angle $\gamma$ of the thyristor converter 1.

Picked up from the secondary 5" of the measuring transformer 5 is a voltage proportional to that across the thyristor converter 1, said picked-up voltage being phase-shifted by an angle $\psi$ with respect to the input voltage of the measuring transformer 6. The angle $\psi$ is variable and depends on the operating mode of the synchronous machine 2.

Picked up from the secondary 5" of the measuring transformer 5 is a voltage having commutation dips resulting from drops of voltages across the inductive elements of the booster transformer 3 and the matching transformer 4 (FIG. 2d). The output of the operational amplifier 11, which is used to add the voltages shown in FIGS. 2c and 2d, produces a sine synchronizing voltage (FIG. 2e).

The apparatus of the invention therefore operates to select in each of phases A, B and C the commutation dips (FIG. 2c) in the synchronizing voltages, to add them to the voltage with commutation dips of the same amplitude but in antiphase relation to the selected commutation dips, with the result that the commutation dips in the curves representing the synchronizing voltages picked up from the outputs of the operational amplifiers 11 are compensated.

As stated above, the accuracy of compensation of the commutation dips in the curves representing the synchronizing voltages is determined by the accuracy with which the drop of the voltages across the inductive elements of the booster transformer 3 and the matching transformer 4 is measured, and by the error of summation of the measured voltages as well.

An increase in the compensation accuracy is attained due to the fact that the measuring transformers 5, 6 and 7 are voltage transformers utilizing the linear portion of the magnetization curve. This provides a condition in which the waveform of the output voltage is identical with the waveform of the input voltage.

The adjusting resistors 8 provide smooth variation of the transfer ratios of the operational amplifiers 11 in a wide range and with higher accuracy.

The compensation error is determined by the error resulted from addition performed in the operational amplifier 11. The addition error is determined by the gain of the operational amplifier 11 in the conductivity open state and by the spread of the parameters of the scaling resistors 9 and 10. The greater the gain of the operational amplifier 11 and the smaller the spread of the parameter of the scaling resistors 9 and 10, the smaller the voltage addition error. At present, operational amplifiers with high gains and a small spread of the resistor parameters are commercially available and the addition of voltage with a small error can easily be attained.

The apparatus of the invention utilizes standard-type elements for the resistors 8, 9 and 10, the operational amplifiers 11 and the measuring transformers 5, 6 and 7. No special requirements are imposed on the transformation ratio of the measuring transformers 5, 6 and 7, since the corresponding transfer ratio for each of the phases A, B and C is set by means of the adjusting resistor 8.

The reliability of the apparatus is increased, as the waveforms of the synchronizing voltages are maintained practically sinusoidal when the commutation dips are compensated. These voltage are then used as reference ones in shaping the control pulses for the thyristor converter so that it offers trouble free operation, the control angles are maintained constant and the control pulses feature a minimal asymmetry. As a result, stable operation of the excitation system is attained for all operating modes of the synchronous machine.

The described embodiment of the apparatus of the invention applies to the excitation system of a synchronous machine utilizing the booster transformer 3 in which case the compensation of the commutation dips in the curves representing the synchronizing voltages is absolutely necessary and cannot by attained by any other means.

However, the apparatus of the invention is applicable to the excitation systems of synchronous machines without a matching transformer. In this case, the secondaries 4" of the matching transformer 4 are coupled directly to the arms of the thyristor converter 1. The primaries 5' and 6' of the measuring transformers 5 and 6 are coupled to each other and are connected in phase relation to the lead-outs of the secondaries 4" of the matching transformer 4.

What is claimed is:

1. An apparatus for compensation of commutation dips in an excitation system of a synchronous machine with a thyristor converter and a matching transformer, comprising:

three measuring transformers implemented as voltage transformers, each of said measuring transformers having primaries and secondaries equal in number to the number of phases of said thyristor converter, first ends of said primaries of first and second measuring transformers being coupled respectively to primaries and secondaries of said matching transformer in antiphase relation to each other, first ends of said primaries of a third measuring transformer being coupled to the arms of said thyristor converter in antiphase relation to said primaries of said second measuring transformer, second ends of said primaries of said measuring transformer being coupled to one another, said secondaries of said measuring transformers being connected in cophasal relation to one another, and first ends of said secondaries of said measuring transformers being joined together to constitute a common point;

adjusting resistors with movable contacts, second ends of said secondaries of each of said measuring transformers being coupled to a respective adjusting resistor;

operational amplifiers equal in number to the number of phases and adding the voltages relating to the corresponding phases of said thyristor converter; and scaling resistors providing for the preset transfer ratios of said operational amplifiers, said movable contact of each of said adjusting resistors being connected in phase relation to the inputs of the corresponding operational amplifier via said scaling resistors.

* * * * *